United States Patent [19]
Noll et al.

[11] Patent Number: 5,455,557
[45] Date of Patent: Oct. 3, 1995

[54] AUXILIARY BACK-UP AND TRAILER COUPLING DEVICE FOR MOTOR VEHICLES

[75] Inventors: Martin Noll, Muggensturm; Ulrich Kanzler; Klaus Krockenberger, both of Stein; Juergen Leinberger, Nuremberg, all of Germany

[73] Assignee: Robert Bosch GmbH, Germany

[21] Appl. No.: 187,974

[22] Filed: Jan. 28, 1994

[30] Foreign Application Priority Data

Feb. 10, 1993 [DE] Germany ............. 43 03 815.8

[51] Int. Cl.⁶ .................................................. G08B 21/00
[52] U.S. Cl. ............. 340/431; 340/435; 340/436; 280/427; 280/DIG. 14
[58] Field of Search .................. 340/431, 435, 340/436; 280/477, DIG. 14

[56] References Cited

U.S. PATENT DOCUMENTS

| | | | |
|---|---|---|---|
| 3,924,257 | 12/1975 | Roberts | 340/431 |
| 4,852,901 | 8/1989 | Beasley et al. | 280/477 |
| 4,938,495 | 7/1990 | Beasley et al. | 340/431 |
| 5,059,946 | 10/1991 | Hollowbush | 340/435 |
| 5,191,328 | 3/1993 | Nelson | 342/431 |

Primary Examiner—John K. Peng
Assistant Examiner—Edward Lefkowitz
Attorney, Agent, or Firm—Kenyon & Kenyon

[57] ABSTRACT

An auxiliary back-up and trailer coupling device for motor vehicles includes ultrasonic sensors mounted on the motor vehicle. The ultrasonic sensors transmit and receive sound waves, and are linked to a control and display device. The device permits the position of a trailer unit that is equipped with a coupling device and arranged behind the motor vehicle to be exactly determined. The trailer is equipped with a coupling device, preferably a tow bar, and has an additional transmitting and receiving ultrasonic sensor.

12 Claims, 5 Drawing Sheets

AUXILIARY BACK-UP AND TRAILER COUPLING DEVICE FOR MOTOR VEHICLES

BACKGROUND OF THE INVENTION

The present invention is directed to an auxiliary back-up and trailer coupling device for motor vehicles which employs ultrasonic sensors. The ultrasonic sensors are mounted on the motor vehicle, are capable of both transmitting and receiving, and are linked to a control unit and display device.

Providing motor vehicles with so-called collision-warning devices, which employ ultrasonic sensors to detect the distance to other objects in the immediate vicinity of the vehicle, is generally known. Such collision-warning devices are designed to emit warning signals when the distance between the vehicle and the objects falls below a predetermined minimum clearance.

Known collision-warning devices, which work according to the echo-sounding principle, are preferably mounted in the rear vehicle area and irradiate sound waves to the rear of the vehicle in an area that cannot be seen by the driver of the motor vehicle. However, such devices give the driver only very general information about whether an obstacle is situated in the rear area of the motor vehicle and what clearance this obstacle has from the motor vehicle.

Unfortunately, such known collision warning devices are inadequate in many situations. In particular, when a vehicle having a coupling is being backed-up to engage (i.e., hitch) a trailer, the only information provided by the known collision warning devices is that an obstacle is present. It would be desirable to have information about the exact position of the trailer's tow bar with respect to the coupling of the motor vehicle.

In particular, damage often occurs when trailers are being hitched to towing vehicles because the coupling of the motor vehicle often does not exactly meet with the trailer tow bar. Since the trailer tow bar is generally an eye ring or a ball head and has relatively small dimensions and reflects poorly, the known echo sounding method employing ultrasonic sensors is unsuitable.

Furthermore, the use of infrared sensors, in addition to the ultrasonic sensors, has been proposed. However, when these sensors are installed so as to be immovable, they disadvantageously cover only a relatively narrow range. As a result, they cannot locate with certainty the tow-bar head of a trailer, for example. Moreover, infrared emitters are very sensitive to pollution. This inhibits their ability to function properly, especially for use with trucks. In addition, infrared emitters have the undesired characteristic of reacting to the effects of outside light, rendering applications under strong insolation (e.g., exposure to sunlight) virtually impossible.

Thus, there exists a need for an auxiliary back-up and coupling device permitting objects situated in the rear area of a motor vehicle, and in particular in the head of a tow bar, to be reliably recognized and positioned. The device preferably employs only one sensor type and remains effective even under difficult environmental conditions.

SUMMARY OF THE INVENTION

The present invention provides a device which meets the above needs. The present invention does so by providing a device for assisting a driver of a motor vehicle to back-up and hitch a trailer equipped with a coupling device which includes ultrasonic sensors mounted on the motor vehicle, a control unit, a display device, and an additional ultrasonic sensor allocated to the coupling device of the trailer. The ultrasonic sensors are adapted to transmit and receive sound waves. The control unit is coupled with the ultrasonic sensors and has an output. The display device has an input coupled with the output of the control unit. The additional ultrasonic sensor is adapted to transmit and receive sound waves.

With the present invention, when a coupling device is allocated to the motor vehicle, and the tow bar of the trailer has an additional ultrasonic sensor which transmits and receives sound waves, exact positioning of the tow-bar head of the trailer relative to a coupling mouth on the motor vehicle is possible.

In a preferred embodiment of the present invention, the ultrasonic sensor secured to the tow bar of the trailer is provided with a timing control and its own power supply. When the device is used as a coupling aid, the direct (i.e., the shortest) sound path between the ultrasonic sensors affixed to the motor vehicle and the ultrasonic sensor affixed to the tow bar of the trailer can be used. As a result, an auxiliary back-up and an auxiliary trailer coupling function can be realized with a generally known distance-warning installation and an autonomously working ultrasonic sensor with a minimum degree of system complexity.

In a preferred embodiment of the present invention, the ultrasonic sensors mounted on the motor vehicle simultaneously emit a pulse at one instant. The ultrasonic sensor mounted on the tow bar of the trailer returns a pulse (e.g., the same pulse as emitted by the ultrasonic sensors) at a deferred (i.e., time-delayed) instant in response. This in turn triggers the release of a new pulse from the ultrasonic sensors mounted on the motor vehicle. Hence, additional transmissions of synchronization pulses using electromagnetic signals, for example infrared light, are no longer needed.

DETAILED DESCRIPTION

Figure 1:
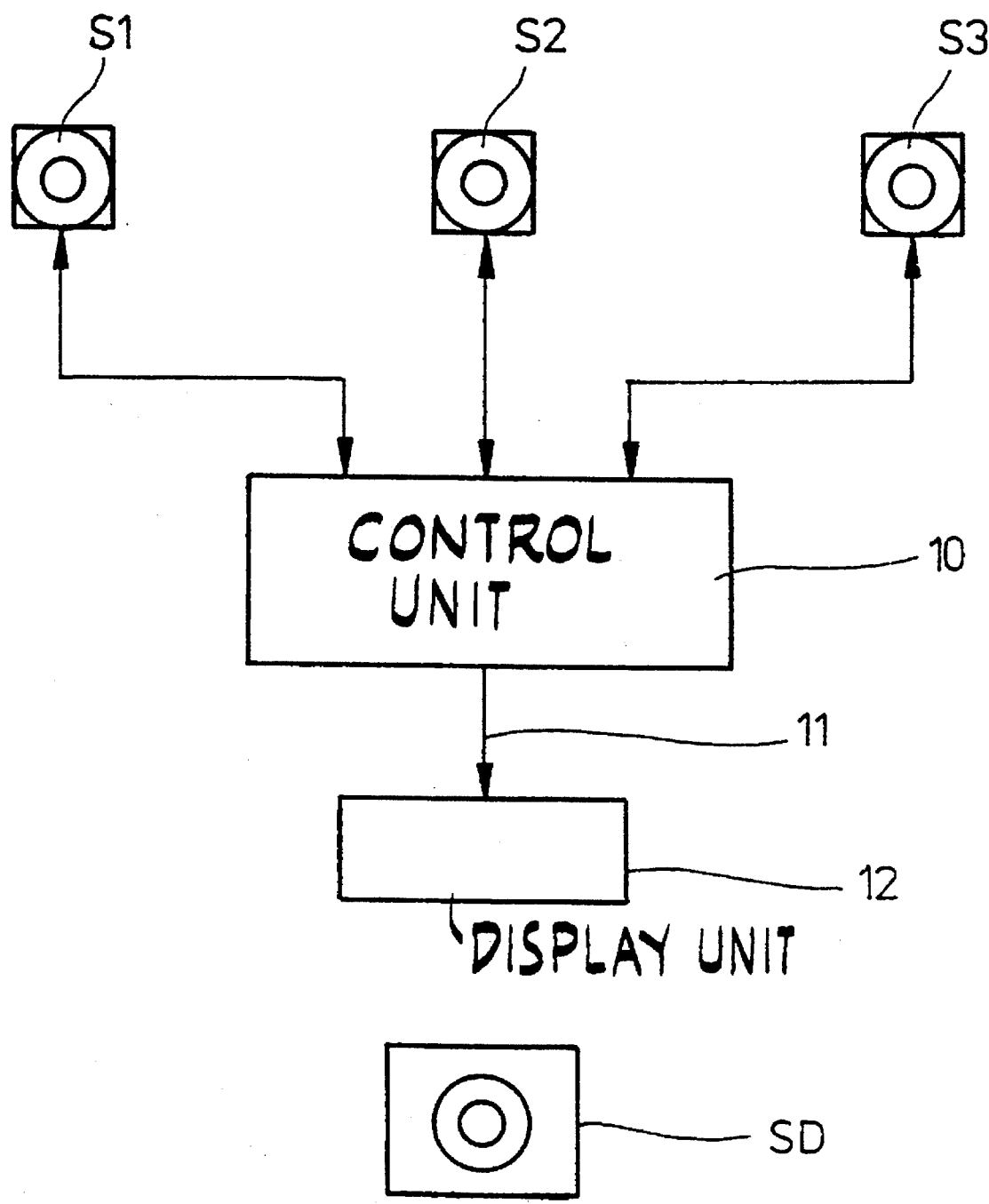
FIG. 1 is a block diagram of an auxiliary back-up and trailer coupling device of the present invention.

FIG. 1 is a block diagram which depicts the auxiliary back-up and trailer coupling device of the present invention. The device includes three ultrasonic sensors S1, S2, S3, which are coupled to a control unit 10. The control unit 10 is linked, via line 11, to a display unit 12, in particular, a digital display unit 12. The ultrasonic sensors S1, S2, S3 are adapted to both transmit and receive sound waves and are mounted on the rear of a motor vehicle (not shown here), preferably on a undercarriage protection provided in motor vehicles.

A further ultrasonic sensor SD is assigned to the ultrasonic sensors S1, S2, S3 and is mounted on a trailer (likewise not shown here). The ultrasonic sensor SD is preferably mounted on the trailer tow bar of the trailer. In particular, the ultrasonic sensor SD is preferably mounted on a holding device provided at the trailer tow bar so that it always has a fixed position relative to the eye ring or to the ball head. Any offset of the tow-bar sensor relative to the ball head or eye ring can be masked out (i.e., compensated for) by software, for example.

The design of the ultrasonic sensor SD is similar to that of the ultrasonic sensors S1, S2, S3, i.e., it is likewise adapted to both transmit and receive sound waves. However, it further includes control electronics (e.g., a timing control) and its own power supply. The power supply of the ultrasonic sensor SD is necessary since no connection exists between the trailer and the towing vehicle in the uncoupled state. The ultrasonic sensor SD preferably also includes a control LED display which indicates the reception of a signal and the functioning of the sensor.

Figure 2:
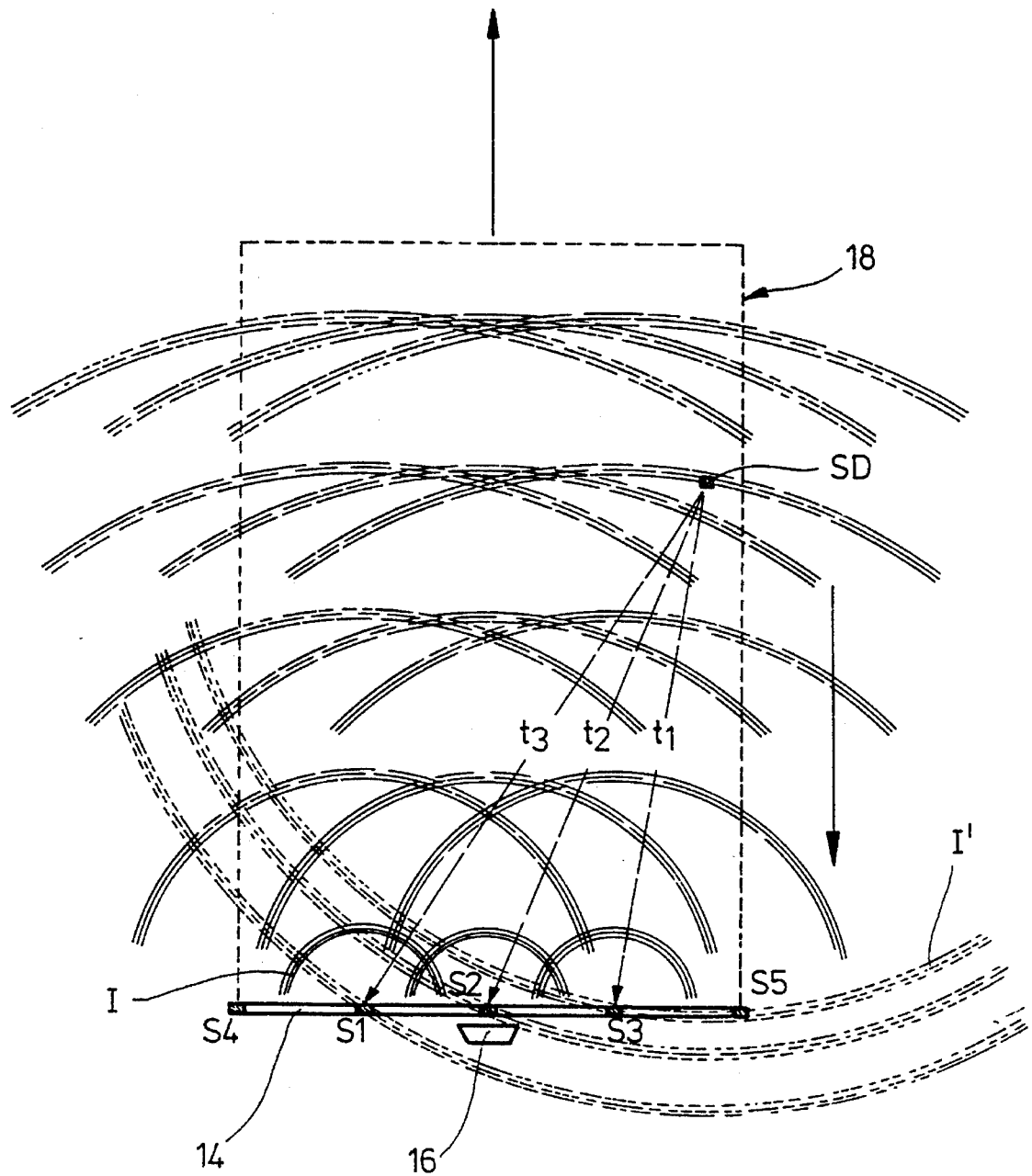
FIG. 2 depicts the measuring principle of the auxiliary trailer coupling device of the present invention.

FIG. 2 clarifies the measuring principle of the device schematically depicted in FIG. 1. The back-up rail 14 may be embodied as the undercarriage protection of a motor vehicle (again not shown). In addition to the ultrasonic sensors S1, S2, S3 shown in FIG. 1, the back-up rail 14 may contain additional ultrasonic sensors S4, S5 at its edge areas. The ultrasonic sensor S2 is situated in the middle of the vehicle and is assigned to a coupling mouth 16 of a coupling device (not shown). The configuration of the ultrasonic sensors S1 through S5 defines a measuring range 18, within which the ultrasonic sensor SD allocated to the tow bar can be located.

Figure 3:
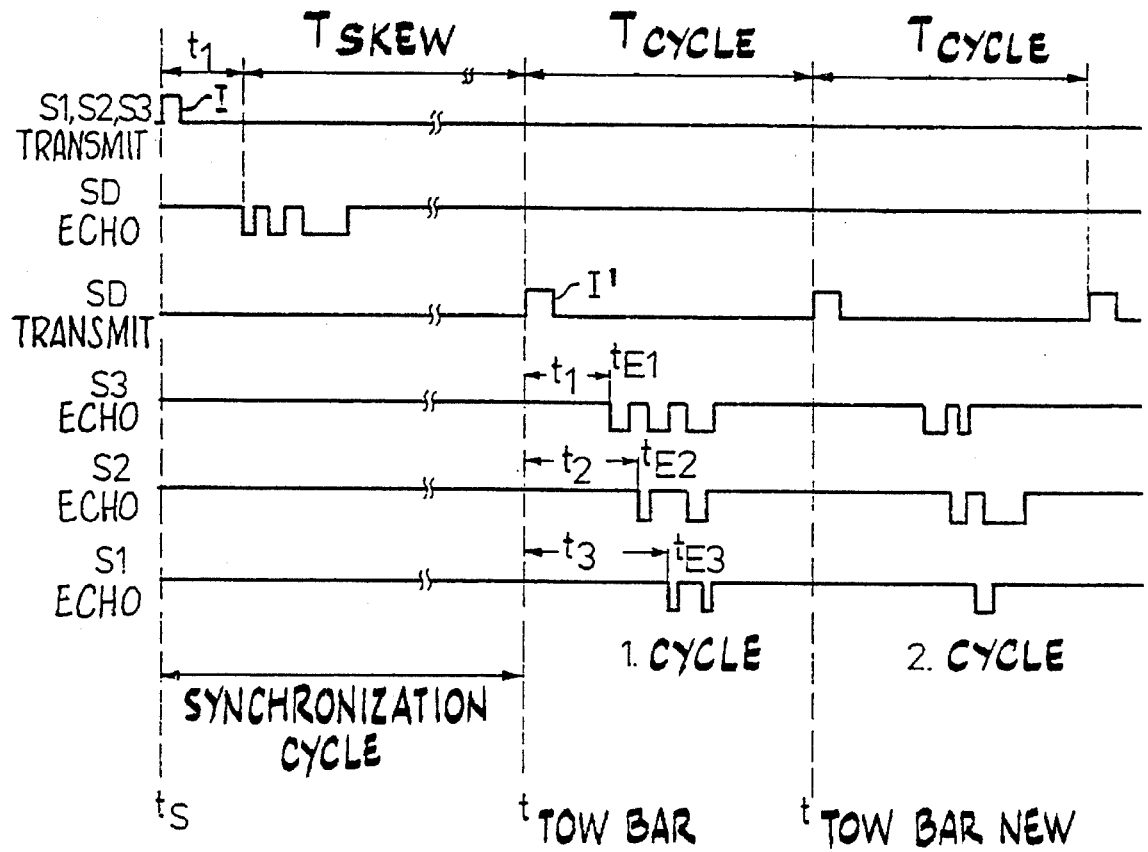
FIG. 3 depicts the signal pattern of the auxiliary trailer coupling device of the present invention.

The operation of the auxiliary coupling device will be described referring to the signal patterns shown in FIG. 3.

At an instant $t_s$, the ultrasonic sensors S1, S2, S3 transmit a pulse I. At a defined instant, the ultrasonic sensor SD receives the pulse I, and retransmits a pulse I' after a delay $t_{skew}$, in which all multiple reflections between the towing vehicle and the trailer die out. The ultrasonic sensors S3, S2 and S1 receive the pulse I' from the ultrasonic sensor SD at the instants $t_{E1}$, $t_{E2}$ and $t_{E3}$, respectively. The shortest delay in the propagation of the pulse to the ultrasonic sensors S1, S2 and S3 can now be calculated based the propagation delay of the pulse I'. In the example depicted in FIGS. 2 and 3, the position of the tow bar is assumed to be at the shortest distance from the ultrasonic sensor S3.

To calculate the transmission instant of the ultrasonic sensor SD mounted on the tow bar, the following equation applies:

$$t_1 = \frac{t_{E1} - t_s - t_{skew}}{2}$$

Thus, for the transmission instant, the following relationship applies:

$$t_{tow\ bar} = t_{E1} t_1.$$

After the transmission instant of the ultrasonic sensor SD assigned to the tow bar is defined, the synchronization cycle of the entire auxiliary coupling device is concluded. The transmission instant of the ultrasonic sensor SD assigned to the tow bar can then be exactly precalculated for the next cycles, each of which define the exact position of the tow bar.

For the new transmission instant, the following relation results:

$$t_{tow\ bar\ new} = t_{tow\ bar\ old} + t_{cycle}.$$

To minimize the propagation errors of the ultrasonic sensors S1, S2, and S3 that work independently from one another, and to measure correctly, even in the case of possible acoustic disturbances, the entire auxiliary coupling device is resynchronized in fixed time intervals by means of periodically emitted synchronization pulses I. The cycles depicted here in FIGS. 2 and 3 are repeated until the tow bar mounted on the trailer is mechanically connected to the coupling mouth 16 arranged on the motor vehicle, i.e., until the ultrasonic sensor SD mounted on the tow bar is at the same position as the ultrasonic sensor S2 arranged on the back-up rail 14.

Figure 4:
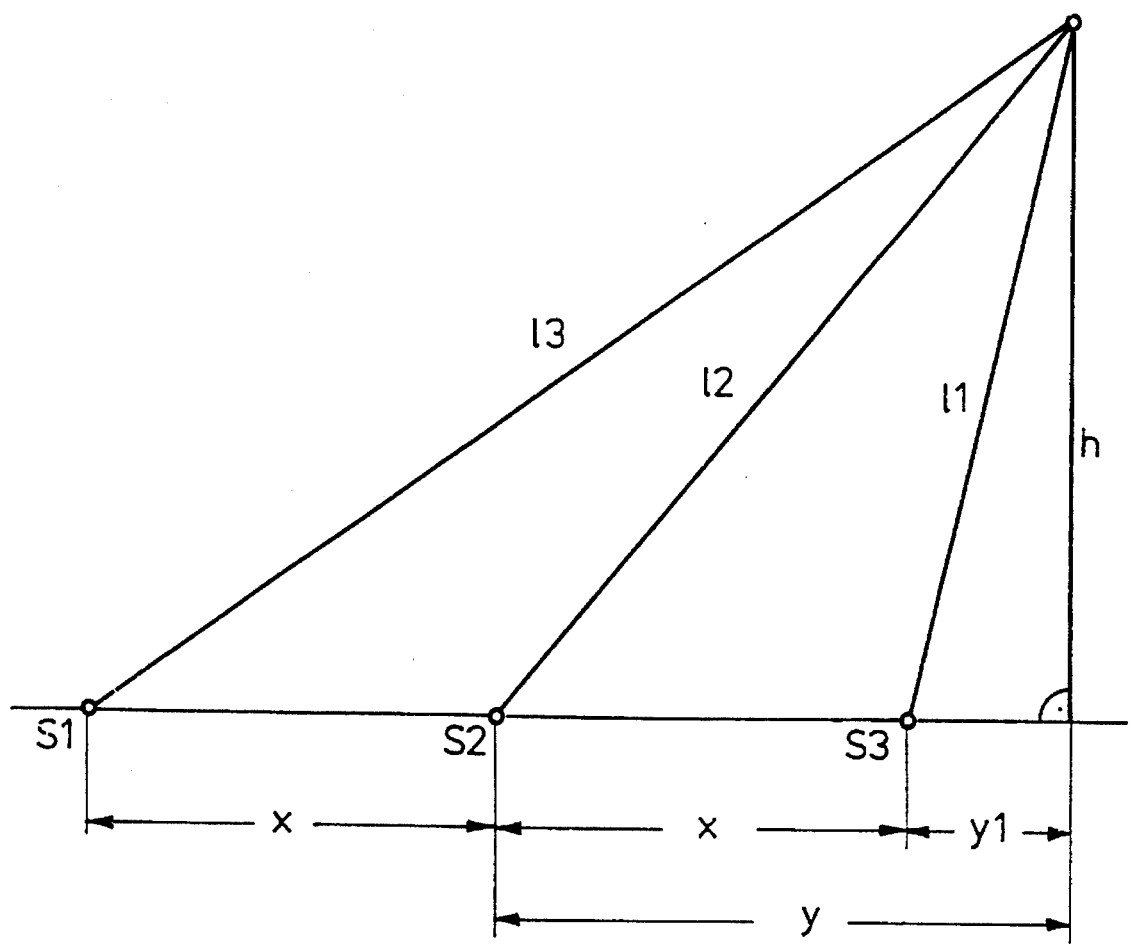
FIG. 4 is a diagram depicting the configuration of the ultrasonic sensors of the present invention.

FIG. 4 further illustrates how the clearance h and the lateral offset y of the ultrasonic sensor SD (i.e., of the tow bar) relative to the coupling mouth 16 are determined. In this case, the distance between the ultrasonic sensors S1, S2 and S3 is denoted by x. The distance x is previously known and, thus, constant at all times. Furthermore, the clearance of the ultrasonic sensor SD (i.e., of the tow bar) from the coupling mouth 16 is designated by h, and the lateral offset from the outwardly situated ultrasonic sensor S3 by $y_1$. The resulting direct distances of the ultrasonic sensor SD to the ultrasonic sensors S1, S2, and S3 are denoted by $l_1$, $l_2$ and $l_3$, respectively. The lengths $l_1$, $l_2$, $l_3$ are determinable by converting the times $t_1$, $t_2$ and $t_3$, respectively, based on the known speed of sound propagation of the pulses emitted by the ultrasonic sensors S1, S2, S3 or SD. That is, $l_1=(t_1)*$(speed of sound of $S_1$), etc. The clearance h and the lateral offset $y_1$ of the tow bar relative to the ultrasonic sensor S3 are defined by the relation:

$$y_1^2 = l_1^2 - h^2.$$

The lateral offset y of the tow bar relative to the coupling mouth 16 (i.e., the ultrasonic sensor S2) is defined by the relation:

$$y^2 = (x+y_1)^2 = l_2^2 - h^2.$$

By subtracting the second equation from the first equation, the following relation is obtained:

$$-2xy_1 = l_1^2 - l_2^2 + x^2.$$

By manipulating this equation, the lateral offset of the ultrasonic sensor SD (i.e., of the tow bar) relative to the ultrasonic sensor S3 is obtained. The following equation results:

$$y_1 = \frac{l_2^2 - l_1^2 - x^2}{2x}.$$

To determine the clearance h, the relation $$h^2 = l_1^2 - y_1^2$$

is established, simply by manipulating the first equation.

However, since the position of the ultrasonic sensor S2 and, thus, of the coupling mouth 16 is now accepted as the reference point for the total lateral deviation, the direction of the lateral deviation should be calculated as follows:

$$y = y_1 + x \text{ for } l_1 < l_3$$

$$y = -(y_1 + x) \text{ for } l_1 > l_3$$

where y is the lateral deviation.

The clearance and/or the lateral deviation of the tow bar from the coupling mouth 16 is determined, in accordance with the above relationships, by the control unit 10 shown in FIG. 1. The display 12 accurately depicts the actual position of the coupling mouth 16 relative to the tow bar. The display 12 enables a driver of the motor vehicle to control the motor vehicle through appropriate steering, and/or driving reactions, so that the driver can safely guide the coupling mouth 16 of the motor vehicle to the tow bar of the trailer even when the driver is not able to see directly behind the rear area of the motor vehicle.

The above described, workable design or mode of operation of an auxiliary coupling device can also be fundamentally applied to an embodiment comprising only two ultrasonic sensors mounted on the motor vehicle. However, by using the three ultrasonic sensors S1, S2, S3 described above, redundant equations permit the signals acquired by way of the ultrasonic sensors S1, S2, S3 to be checked for plausibility. This redundancy permits potential interference effects to be reliably avoided.

Figure 5:
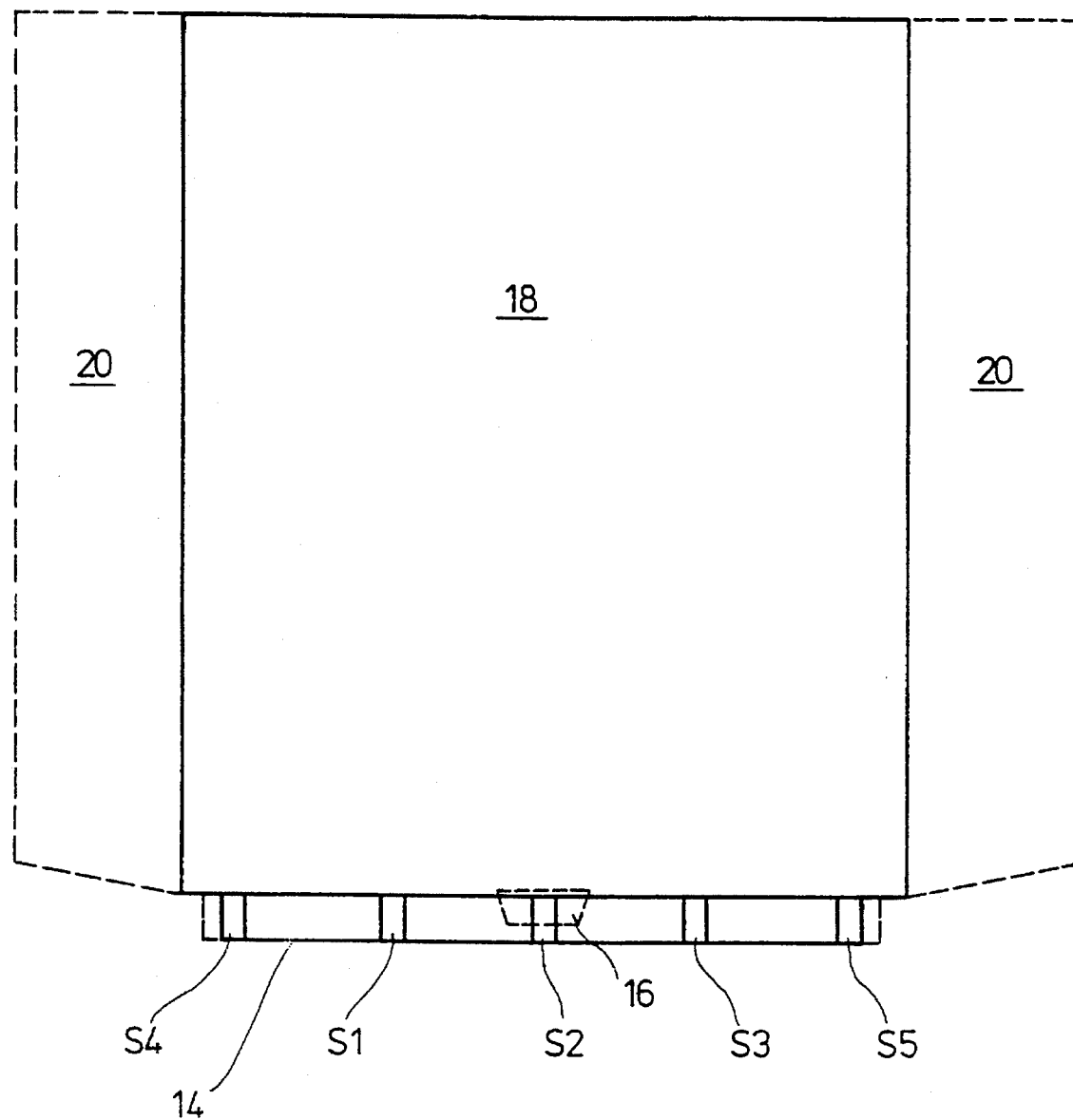
FIG. 5 illustrates the measuring range of an auxiliary trailer coupling device of the present invention.

As illustrated in FIG. 5, the measuring area 18 illustrated in FIG. 2 can be laterally expanded, by one measuring area 20 at each side, by adding ultrasonic sensors S4 or S5. Thus, by increasing the number of ultrasonic sensors mounted on the back-up rail 14 of the motor vehicle, the detecting range of the lateral deviation y can be enlarged in a simple manner. Further, the five ultrasonic sensors provide further redundant equations, thereby permitting further plausibility checks. As a result, the coupling mouth 16 can be conducted with still greater accuracy to a tow bar configured inside the entire measuring area 18, inclusive of the additional measuring area 20. In principle, however, a sufficient degree of accuracy is already achieved with the configuration of three ultrasonic sensors S1, S2, S3.

The mode of operation of the arrangement comprising five ultrasonic sensors is analogous to that of the described arrangement comprising three ultrasonic sensors, the details of which will be apparent to those skilled in the art.

What is claimed is:

1. A device for assisting a driver of a motor vehicle to back-up and hitch a trailer equipped with a coupling device, comprising:
   a) ultrasonic sensors, the ultrasonic sensors
      i) mounted on the motor vehicle, and
      ii) adapted to transmit and receive sound waves;
   b) a control unit coupled with the ultrasonic sensors and having an output;
   c) a display device having an input coupled with the output of the control unit; and
   d) an additional ultrasonic sensor, the additional ultrasonic sensor
      i) disposed in a fixed position relative to the coupling device of the trailer, and
      ii) adapted to receive said sound waves, and further adapted to transmit additional sound waves in response to said sound waves transmitted by said ultrasonic sensors and received by said additional ultrasonic sensor;
   wherein said control unit determines a position of the motor vehicle relative to the trailer based on said additional sound waves transmitted by said additional ultrasonic sensor.

2. The device of claim 1 wherein the coupling device of the trailer is a tow bar.

3. The device of claim 1 wherein the additional ultrasonic sensor includes a timing controller for controlling a cycle of said additional sound waves transmitted by said additional ultrasonic sensor and a power supply for supplying power to said additional ultrasonic sensor.

4. The device of claim 1 wherein the additional ultrasonic sensor is adapted to transmit a pulse, thereby forming a plurality of sound paths between the additional ultrasonic sensor and the ultrasonic sensors, and
   wherein the control unit uses the shortest of the plurality of sound paths to determine a lateral offset and a clearance of the coupling device of the trailer relative to the motor vehicle.

5. The device of claim 1 wherein the ultrasonic sensors include at least three ultrasonic sensors, one of which is provided at a coupling mouth located in the middle rear of the vehicle.

6. The device of claim 5 wherein the ultrasonic sensors consist of three ultrasonic sensors.

7. The device of claim 5 wherein the ultrasonic sensors consist of five ultrasonic sensors.

8. The device of claim 1 wherein the ultrasonic sensors are adapted to simultaneously emit pulses at a first instant, and wherein the additional ultrasonic sensor is adapted to emit a pulse at a second instant in response to the pulses emitted by the ultrasonic sensors at the first instant.

9. The device of claim 8 wherein the ultrasonic sensors are each adapted to emit a new pulse in response to the pulse emitted by the additional ultrasonic sensor.

10. The device of claim 1 wherein the ultrasonic sensors are adapted to automatically emit synchronization pulses at specific time intervals.

11. The device of claim 1 wherein the ultrasonic sensors are spaced from one another by a constant distance.

12. The device of claim 1 wherein the control unit is adapted to check signals from the ultrasonic sensors for plausibility using redundant equations.

* * * * *

UNITED STATES PATENT AND TRADEMARK OFFICE
CERTIFICATE OF CORRECTION

PATENT No. : 5,455,557

DATED : October 3, 1995

INVENTOR(S): Martin Noll, et al.

It is certified that error appears in the above-identified patent and that said Letters Patent is hereby corrected as shown below:

Column 3, line 53 "$t_{E1}t_1$" should be -- $t_{E1} - t_1$ --

Signed and Sealed this

Fourteenth Day of May, 1996

*Attest:*

BRUCE LEHMAN

*Attesting Officer*     *Commissioner of Patents and Trademarks*